United States Patent
Wada et al.

(10) Patent No.: US 11,695,129 B2
(45) Date of Patent: Jul. 4, 2023

(54) MANUFACTURING METHOD AND MANUFACTURING APPARATUS FOR FUEL CELL UNIT

(71) Applicant: HONDA MOTOR CO., LTD., Tokyo (JP)

(72) Inventors: Yusuke Wada, Wako (JP); Shintaro Sumi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 12 days.

(21) Appl. No.: 17/395,790

(22) Filed: Aug. 6, 2021

(65) Prior Publication Data

US 2022/0045341 A1 Feb. 10, 2022

(30) Foreign Application Priority Data

Aug. 7, 2020 (JP) ................ 2020-134303

(51) Int. Cl.
*H01M 8/0297* (2016.01)
*H01M 8/1004* (2016.01)
*H01M 8/0273* (2016.01)
*B29C 65/02* (2006.01)
*H01M 8/10* (2016.01)

(52) U.S. Cl.
CPC .......... *H01M 8/0297* (2013.01); *B29C 65/02* (2013.01); *H01M 8/0273* (2013.01); *H01M 8/1004* (2013.01); *H01M 2008/1095* (2013.01); *H01M 2250/20* (2013.01)

(58) Field of Classification Search
CPC ............. H01M 8/0297; H01M 8/0273; H01M 8/1004; H01M 2008/1095; H01M 2250/20; B29C 65/02
See application file for complete search history.

(56) References Cited

U.S. PATENT DOCUMENTS 10,014,548 B2 * 7/2018 Nishiyama .......... H01M 8/0284
10,297,841 B2 5/2019 Nitta et al.
(Continued)

FOREIGN PATENT DOCUMENTS

CN 106328969 A * 1/2017 .......... H01M 4/8605
JP 4516279 B2 8/2010
(Continued)

OTHER PUBLICATIONS

Piao, Xiang-xun, Battery pack, 2020, CN-111864128-A (Year: 2020).*

*Primary Examiner* — Cynthia H Kelly
*Assistant Examiner* — Jenna Shulman
(74) *Attorney, Agent, or Firm* — Carrier Shende & Associates, P.C.; Fulchand P. Shende; Joseph P. Carrier

(57) ABSTRACT

The manufacturing method for the fuel cell unit includes a stacking step and a laser irradiation step. In the stacking step, a stacked portion including, stacked together, a resin frame member of a resin frame equipped membrane electrode assembly and an outer peripheral portion of a separator is placed on a metal spacer. The resin frame member at a joining target portion of the stacked portion is placed so as to face a recess of the metal spacer. In the laser irradiation step, the separator at the joining target portion in a state where the resin frame member faces the recess is irradiated with a laser beam to thereby form a welded portion where the resin frame member and the separator are welded to each other.

8 Claims, 10 Drawing Sheets

(56) References Cited

U.S. PATENT DOCUMENTS

| | | | |
|---|---|---|---|
| 2005/0208361 A1* | 9/2005 | Enjoji | B29C 66/742 |
| | | | 429/510 |
| 2014/0227622 A1* | 8/2014 | Nishiyama | H01M 8/242 |
| | | | 429/482 |
| 2019/0288298 A1* | 9/2019 | Suzuki | B32B 9/046 |
| 2021/0242474 A1 | 8/2021 | Ohmori et al. | |

FOREIGN PATENT DOCUMENTS

| | | | |
|---|---|---|---|
| JP | 5187811 B2 * | 4/2013 | H01M 8/0206 |
| JP | 2014-132548 A | 7/2014 | |
| JP | 2014-194876 A | 10/2014 | |
| JP | 2015-198068 A | 11/2015 | |
| JP | 2016-195106 A | 11/2016 | |
| JP | 2021-120927 A | 8/2021 | |
| JP | 2021-125329 A | 8/2021 | |
| WO | WO-03096466 A1 * | 11/2003 | H01M 4/8605 |

* cited by examiner

MANUFACTURING METHOD AND MANUFACTURING APPARATUS FOR FUEL CELL UNIT

CROSS-REFERENCE TO RELATED APPLICATION

This application is based upon and claims the benefit of priority from Japanese Patent Application No. 2020-134303 filed on Aug. 7, 2020, the contents of which are incorporated herein by reference.

BACKGROUND OF THE INVENTION

Field of the Invention

The present invention relates to a manufacturing method and a manufacturing apparatus for a fuel cell unit.

Description of the Related Art

For example, a polymer electrolyte fuel cell includes a membrane electrode assembly (MEA). The membrane electrode assembly includes an electrolyte membrane made of a polymer ion exchange membrane. An anode electrode is disposed on one surface of the electrolyte membrane. A cathode electrode is disposed on the other surface of the electrolyte membrane. A power generation cell (unit cell) is formed by sandwiching the membrane electrode assembly between separators. The fuel cell is used as, for example, an in-vehicle fuel cell stack. The fuel cell stack is usually configured by stacking several tens to several hundreds of power generation cells.

The fuel cell stack may comprise a so-called internal manifold. The internal manifold is configured to supply a fuel gas as a reactant gas to the anode of each of the stacked power generation cells. The internal manifold is configured to supply an oxygen-containing gas as a reactant gas to the cathode of each of the stacked power generation cells. In the fuel cell stack including the internal manifold, it is required to ensure the sealing property of the reactant gas. Therefore, it is necessary to assemble the fuel cell stack in a state in which the membrane electrode assembly and the separator are accurately positioned.

For example, a fuel cell disclosed in JP 4516279 B2 is known. In the membrane electrode assembly of the fuel cell, the gas diffusion layer constituting one electrode is provided so as to cover the entire surface of the electrolyte membrane. The gas diffusion layer constituting the other electrode has a planar dimension smaller than that of the electrolyte membrane. The separator is integrally provided with a seal member. The seal member is provided with a plurality of convex portions spaced apart from each other. The plurality of convex portions are provided for positioning the outer peripheral end portion of the gas diffusion layer constituting one electrode, the outer peripheral end portion of the electrolyte membrane, and the separator.

SUMMARY OF THE INVENTION

Meanwhile, for example, in order to reduce the amount of use of a relatively expensive electrolyte membrane material, a thin electrolyte membrane is used. In such an electrolyte membrane, the strength is likely to decrease by thinning. Therefore, a resin frame equipped membrane electrode assembly in which a resin frame member is provided on the outer periphery of the membrane electrode assembly is employed. In the resin frame equipped membrane electrode assembly, particularly the outer periphery of the electrolyte membrane can be protected by the resin frame member. In addition, the surface size of the electrolyte membrane can be reduced by the resin frame member. However, the resin frame member is likely to warp. Therefore, as described above, even in the configuration in which the resin frame equipped membrane electrode assembly is engaged with the positioning convex portion of the separator, there is a concern that positional deviation occurs between the resin frame equipped membrane electrode assembly and the separator.

An object of the present invention is to solve the above-described problems.

According to one aspect of the present invention, there is provided a manufacturing method for a fuel cell unit obtained by joining a resin frame equipped membrane electrode assembly to a separator, the resin frame equipped membrane electrode assembly including a membrane electrode assembly and a resin frame member attached to an outer peripheral portion of the membrane electrode assembly, the membrane electrode assembly including an electrolyte membrane and electrodes disposed on both sides of the electrolyte membrane, the manufacturing method including a stacking step and a laser irradiation step, wherein: in the stacking step, a stacked portion including, stacked together, the resin frame member of the resin frame equipped membrane electrode assembly and an outer peripheral portion of the separator is placed on a metal spacer, and the resin frame member at a joining target portion of the stacked portion is placed so as to face a recess formed in the metal spacer; and in the laser irradiation step, a welded portion where the resin frame member and the separator are welded to each other is formed by irradiating the separator at the joining target portion with a laser beam in a state where the resin frame member faces the recess.

According to another aspect of the present invention, there is provided a manufacturing apparatus for a fuel cell unit obtained by joining a resin frame equipped membrane electrode assembly to a separator, the resin frame equipped membrane electrode assembly including a membrane electrode assembly and a resin frame member attached to an outer peripheral portion of the membrane electrode assembly, the membrane electrode assembly including an electrolyte membrane and electrodes disposed on both sides of the electrolyte membrane, the manufacturing apparatus comprising a metal spacer and a laser irradiation unit, wherein: the metal spacer is provided with a recess; the recess faces the resin frame member at a joining target portion of a stacked portion; the stacked portion is formed by stacking the resin frame member of the resin frame equipped membrane electrode assembly and an outer peripheral portion of the separator; and the laser irradiation unit forms a welded portion where the resin frame member and the separator are welded together, by irradiating the separator at the joining target portion with a laser beam in a state where the resin frame member faces the recess.

In the present invention, the stacked portion including, stacked together, the resin frame member of the resin frame equipped membrane electrode assembly and the outer peripheral portion of the separator is placed on the metal spacer. At this time, the resin frame member of the joining target portion of the stacked portion is placed so as to face the recess formed in the metal spacer. In this state, a portion of the resin frame member is melted by irradiating the separator with the laser beam at the joining target portion of the stacked portion to heat the joining target portion. As a result, the welded portion in which the separator and the resin frame member have been welded to each other can be formed. In this manner, the welded portion is formed in a state in which the resin frame member is positioned with respect to the separator. Therefore, even if the resin frame member is warped, the separator and the resin frame equipped membrane electrode assembly can be fixed in a state in which mutual displacement is suppressed.

Further, when the joining target portion of the stacked portion is irradiated with the laser beam as described above, the resin frame member of the joining target portion faces the recess of the metal spacer. That is, the resin frame member of the joining target portion faces the recess formed in the metal spacer so as to be recessed in a direction away from the resin frame member disposed on the metal spacer. Therefore, even if the resin frame member of the joining target portion is heated and expanded by the irradiation of the laser beam, the expanded portion of the resin frame member can enter the inside of the recess.

This can suppress a partial increase in the contact pressure between the resin frame member and the metal spacer during laser irradiation. In addition, it is possible to suppress generation of a portion where excessive heat is accumulated between the resin frame member and the metal spacer during laser irradiation. That is, the heat of the resin frame member can be favorably conducted to the metal spacer, and thus it is possible to achieve a temperature suitable for substantially uniformly welding the joining target portion of the stacked portion. As a result, for example, the welded portion having a desired shape in which generation of air bubbles is suppressed and having excellent joint strength can be formed in the joining target portion. This also effectively prevents the resin frame equipped membrane electrode assembly and the separator from being displaced from each other. In addition, the resin frame equipped membrane electrode assembly and the separator can be favorably maintained in a positioned state.

As described above, according to the present invention, the resin frame equipped membrane electrode assembly and the separator can be accurately and easily positioned. Therefore, it is possible to suppress the occurrence of displacement between the resin frame equipped membrane electrode assembly and the separator as much as possible.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
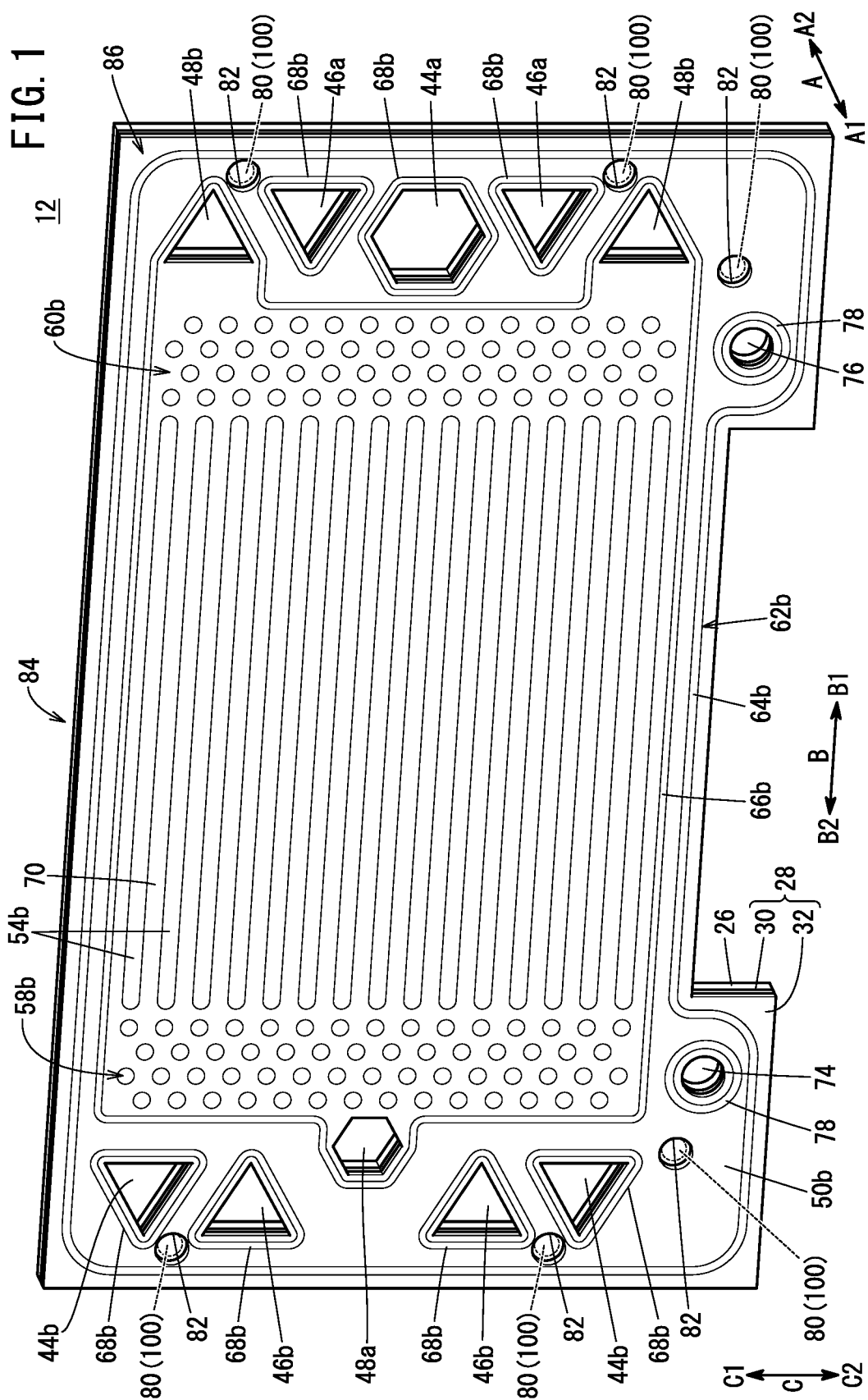
FIG. 1 is a perspective view of a fuel cell unit obtained by applying a manufacturing method for a fuel cell unit according to the present embodiment.

In the following drawings, components having the same or similar functions and effects are denoted by the same reference numerals, and repeated description thereof may be omitted.

Figure 2:
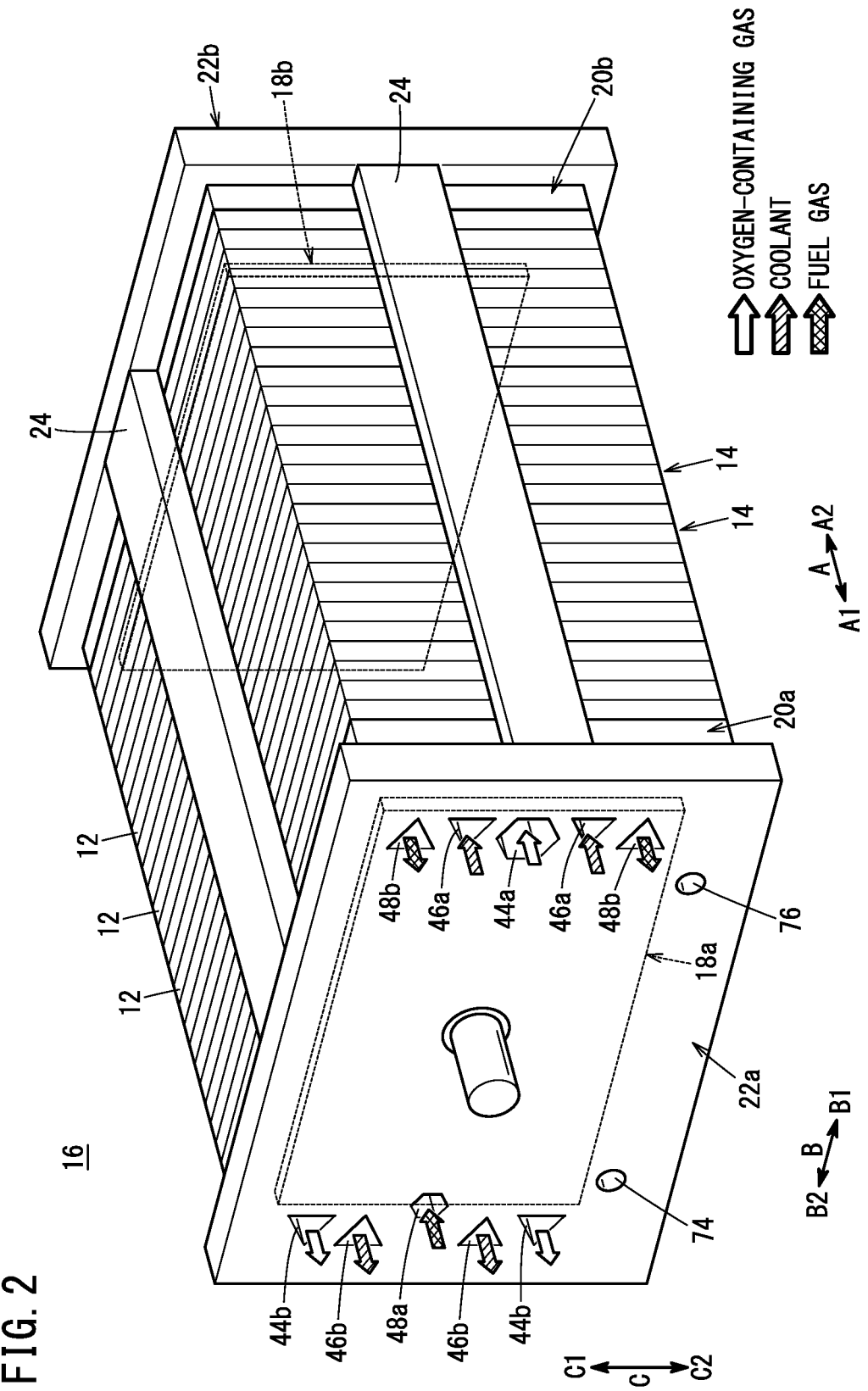
FIG. 2 is a perspective view of a fuel cell stack including the fuel cell units of FIG. 1.
Figure 3:
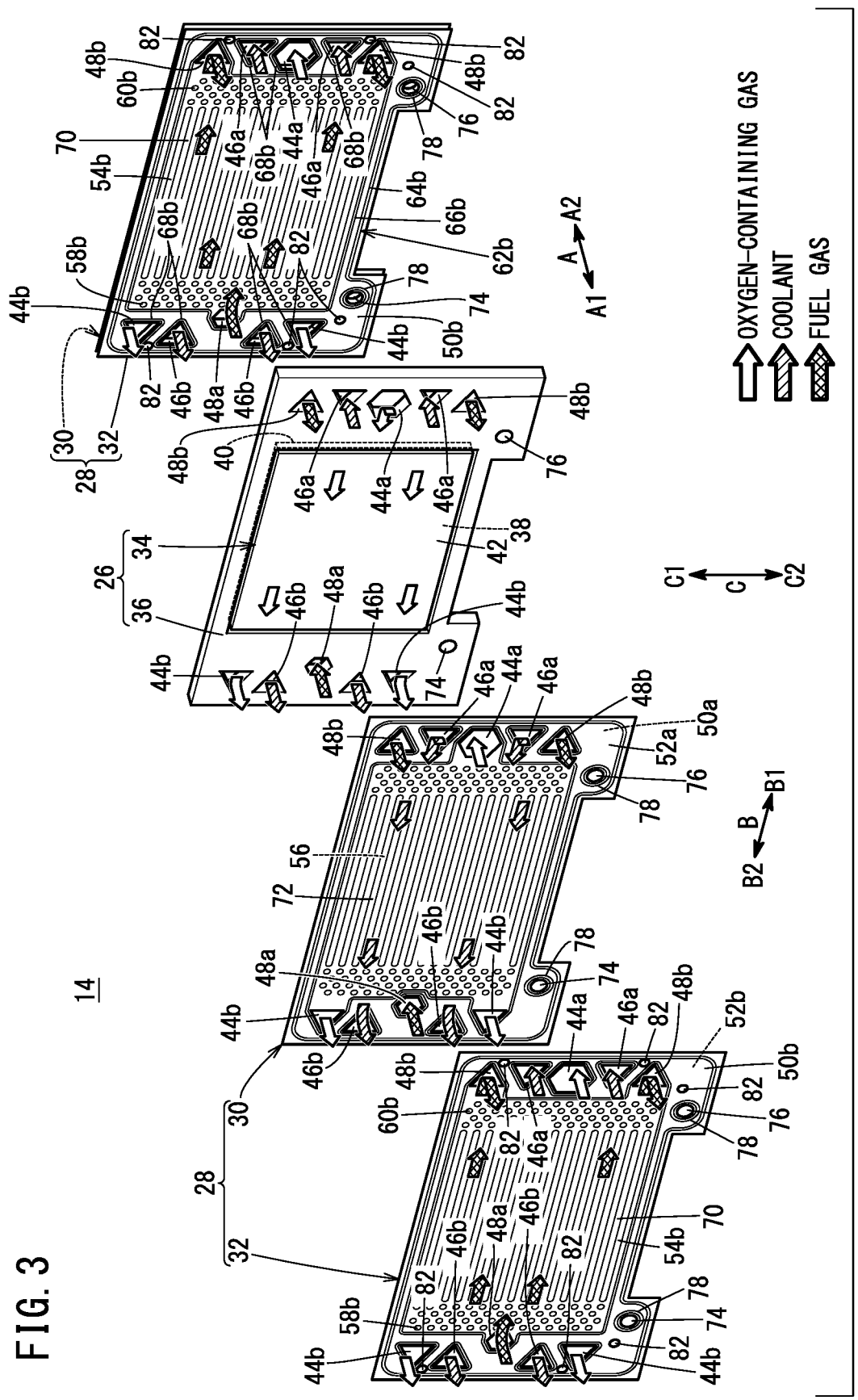
FIG. 3 is an exploded perspective view of the power generation cell.

A plurality of fuel cell units 12 (FIG. 1) obtained by applying the manufacturing method and manufacturing apparatus 10 (FIG. 8) for a fuel cell unit according to the present embodiment can be stacked to form the power generation cell 14 shown in FIGS. 2 and 3. The plurality of power generation cells 14 are stacked in the horizontal direction (direction of arrow A) or the vertical direction (direction of arrow C) to form the fuel cell stack 16 of FIG. 2. The fuel cell stack 16 is mounted on a fuel cell vehicle such as a fuel cell electric vehicle (not shown).

As shown in FIG. 2, a terminal plate 18a, an insulator 20a, and an end plate 22a are disposed toward the outside in this order at one end portion (end portion in the arrow A1 direction) in the stacking direction (arrow A direction) of the plurality of power generation cells 14. A terminal plate 18b, an insulator 20b, and an end plate 22b are disposed, in this order toward the outside, at the other end portion (end portion in the arrow A2 direction) in the stacking direction of the plurality of power generation cells 14.

The insulators 20a and 20b are formed of an insulating material. Examples of the insulating material include polycarbonate (PC) and phenol resin. The insulators 20a and 20b may be formed of a plurality of sheets (for example, two sheets) stacked in the stacking direction.

A connecting bar 24 is disposed between each side of the rectangular end plate 22a and each side of the rectangular end plate 22b. Both ends of each connecting bar 24 are fixed to respectively the inner surface of the end plate 22a and the inner surface of the end plate 22b via bolts (not shown). Thus, each connecting bar 24 applies a tightening load in the stacking direction (the direction of arrow A) to the plurality of stacked power generation cells 14. The fuel cell stack 16 may include a housing having end plates 22a and 22b. In this case, the stack body 84 is accommodated in the housing.

As shown in FIG. 3, each power generation cell 14 includes a resin frame equipped membrane electrode assembly 26 and a pair of separators 28 sandwiching the resin frame equipped membrane electrode assembly 26. Each separator 28 is formed by integrally joining an outer peripheral portion of the first bipolar plate 30 and an outer peripheral portion of the second bipolar plate 32 in a stacked state. An example of a method of joining the first bipolar plate 30 and the second bipolar plate 32 includes at least one of welding, brazing, and crimping. For example, the first bipolar plate 30 and the second bipolar plate 32 are metal plates such as steel plates, stainless steel plates, aluminum plates, plated steel sheets, or metal plates having anti-corrosive surfaces by surface treatment. Each of the first bipolar plate 30 and the second bipolar plate 32 is formed by corrugating metal thin plates by press forming to have a corrugated shape in cross section and a wavy shape on the surface.

Note that the separator 28 is not limited to a structure in which the first bipolar plate 30 and the second bipolar plate 32 are joined together. The separator 28 may be formed of one metal plate, one carbon plate, or the like.

As shown in FIG. 3, the resin frame equipped membrane electrode assembly 26 includes a membrane electrode assembly (MEA) 34 and a resin frame member 36. The resin frame member 36 is joined to the outer peripheral portion of the membrane electrode assembly 34. The resin frame member 36 extends along the entire outer peripheral portion of the membrane electrode assembly 34 in the circumferential direction. The membrane electrode assembly 34 includes an electrolyte membrane 38, an anode 40, and a cathode 42. The anode 40 is provided on one surface (surface in the direction of the arrow A2) of the electrolyte membrane 38. The cathode 42 is provided on the other surface of the electrolyte membrane 38 (the surface facing the arrow A1 direction).

The electrolyte membrane 38 is, for example, a solid polymer electrolyte membrane (cation exchange membrane) such as a thin membrane of perfluorosulfonic acid containing water. The electrolyte membrane 38 is sandwiched between the anode 40 and the cathode 42. As the electrolyte membrane 38, an HC (hydrocarbon) based electrolyte may be used in addition to the fluorine-based electrolyte.

The anode 40 includes an anode catalyst layer and an anode gas diffusion layer, which are not shown. The anode catalyst layer is joined to one surface of the electrolyte membrane 38. The anode gas diffusion layer is laminated on the anode catalyst layer. The cathode 42 includes a cathode catalyst layer and a cathode gas diffusion layer. The cathode catalyst layer is joined to the other surface of the electrolyte membrane 38. The cathode gas diffusion layer is laminated on the cathode catalyst layer.

For example, porous carbon particles having a platinum alloy supported on the surface thereof are uniformly applied to the surface of the anode gas diffusion layer together with an ion conductive polymer binder. Thus, an anode catalyst layer is formed. For example, porous carbon particles having a platinum alloy supported on the surface thereof are uniformly applied to the surface of the cathode gas diffusion layer together with an ion conductive polymer binder. Thus, a cathode catalyst layer is formed.

The cathode gas diffusion layer is formed of, for example, a conductive porous sheet such as carbon paper or carbon cloth. The anode gas diffusion layer is formed of, for example, a conductive porous sheet such as carbon paper or carbon cloth. A porous layer (not shown) may be provided at least one of between the cathode catalyst layer and the cathode gas diffusion layer and between the anode catalyst layer and the anode gas diffusion layer.

The resin frame member 36 has a frame shape. For example, the inner peripheral edge portion of the resin frame member 36 is joined to the outer peripheral edge portion of the membrane electrode assembly 34. The joint structure between the resin frame member 36 and the membrane electrode assembly 34 is not particularly limited. In one aspect of the above-described joint structure, a peripheral edge portion of the resin frame member 36 may be sandwiched between the outer peripheral edge portion of the cathode gas diffusion layer and the outer peripheral edge portion of the anode gas diffusion layer. In this case, the inner peripheral end surface of the resin frame member 36 may be close to the outer peripheral end surface of the electrolyte membrane 38. The inner peripheral end surface of the resin frame member 36 may be in contact with the outer peripheral end surface of the electrolyte membrane 38. The inner peripheral end surface of the resin frame member 36 may overlap the outer peripheral end surface of the electrolyte membrane 38.

Instead of the above-described joint structure, the following joint structure may be employed. The outer peripheral edge part of the electrolyte membrane 38 is projected more outward than the cathode gas diffusion layer. The outer peripheral edge part of the electrolyte membrane 38 is projected more outward than the anode gas diffusion layer. Frame-shaped films are provided on both sides of the outer peripheral edge portion of the electrolyte membrane 38 protruding as described above. Thus, the resin frame member 36 is formed. That is, the resin frame member 36 may be formed of a plurality of laminated frame-shaped films. The plurality of laminated frame-shaped films are bonded to each other with an adhesive or the like.

Examples of the material of the resin frame member 36 include polyphenylene sulfide (PPS), polyphthalamide (PPA), polyethylene naphthalate (PEN), polyether sulfone (PES), liquid crystal polymer (LCP), polyvinylidene fluoride (PVDF), silicone resin, fluorine resin, modified polyphenylene ether resin (m-PPE), polyethylene terephthalate (PET), polybutylene terephthalate (PBT), and modified polyolefin.

In the power generation cell 14, one oxygen-containing gas supply passage 44a is formed in one end portion (end portion in the direction indicated by the arrow B1) of the separator 28 and the resin frame member 36 in the long-side direction so as to extend through the cell in the stacking direction (direction indicated by the arrow A). In the power generation cell 14, two coolant supply passages 46a are provided in one end portion (end portion in the arrow B1 direction) in the long side direction of the separator 28 and the resin frame member 36 so as to extend through the cell in the stacking direction (arrow A direction). In the power generation cell 14, two fuel gas discharge passages 48b are provided in one end portion (end portion in the direction of the arrow B1) in the long-side direction of the separator 28 and the resin frame member 36 so as to extend through the cell in the stacking direction (direction of the arrow A).

In the power generation cell 14, one fuel gas supply passage 48a is provided at the other end portion (end portion in the direction of the arrow B2) in the long side direction of the separator 28 and the resin frame member 36 so as to extend through the cell in the stacking direction. In the power generation cell 14, two coolant discharge passages 46b are provided at the other end portion (end portion in the arrow B2 direction) in the long side direction of the separator 28 and the resin frame member 36 so as to extend through the cell in the stacking direction. In the power generation cell 14, two oxygen-containing gas discharge passages 44b are provided at the other end (end in the direction of the arrow B2) of the separator 28 and the resin frame member 36 in the long-side direction so as to extend through the cell in the stacking direction.

An oxygen-containing gas is supplied to the oxygen-containing gas supply passage 44a. The coolant is supplied to the coolant supply passages 46a. The coolant includes, for example, at least one of pure water, ethylene glycol, and oil. The fuel gas (for example, a hydrogen-containing gas), which is a hydrogen-containing gas, is discharged from the fuel gas discharge passages 48b. The fuel gas is supplied to the fuel gas supply passage 48a. The coolant is discharged from the coolant discharge passages 46b. The oxygen-containing gas is discharged from the oxygen-containing gas discharge passages 44b.

The oxygen-containing gas supply passage 44a extends, in the stacking direction, through the fuel cell stack 16 except for the terminal plates 18a and 18b (FIG. 1). The coolant supply passages 46a extend, in the stacking direction, through the fuel cell stack 16 except for the terminal plates 18a and 18b (FIG. 1). The fuel gas discharge passages 48b extend, in the stacking direction, through the fuel cell stack 16 except for the terminal plates 18a and 18b (FIG. 1). The fuel gas supply passage 48a extends, in the stacking direction, through the fuel cell stack 16 except for the terminal plates 18a and 18b (FIG. 1). The coolant discharge passages 46b extend, in the stacking direction, through the fuel cell stack 16 except for the terminal plates 18a and 18b (FIG. 1). The oxygen-containing gas discharge passages 44b extend, in the stacking direction, through the fuel cell stack 16 excluding the terminal plates 18a and 18b (FIG. 1). Hereinafter, the oxygen-containing gas supply passage 44a, the coolant supply passages 46a, the fuel gas discharge passages 48b, the fuel gas supply passage 48a, the coolant discharge passages 46b, and the oxygen-containing gas discharge passages 44b may be collectively referred to as "passages".

In the present embodiment, the passages are arranged in the vertical direction (direction of arrow C). To be specific, two fuel gas discharge passages 48b are disposed at one end portion (end portion in the arrow B1 direction) in the long side direction of the power generation cell 14 so as to be separated from each other in the vertical direction. Between these two fuel gas discharge passages 48b, two coolant supply passages 46a are arranged apart from each other in the vertical direction. The oxygen-containing gas supply passage 44a is disposed between the two coolant supply passages 46a.

At the other end portion (end portion in the direction of the arrow B2) in the long-side direction of the power generation cell 14, the two oxygen-containing gas discharge passages 44b are arranged so as to be separated from each other in the vertical direction. Between these two oxygen-containing gas discharge passages 44b, the two coolant discharge passages 46b are arranged so as to be vertically separated from each other. The fuel gas supply passage 48a is disposed between the two coolant discharge passages 46b.

Note that the passages are not limited to the above-described arrangement, and can be appropriately set so as to be arranged according to required specifications. Unlike the present embodiment, the pair of coolant supply passages 46a may be provided on both sides of the fuel gas supply passage 48a in the vertical direction (arrow C direction). In this case, the pair of coolant discharge passages 46b may be provided on both sides of the oxygen-containing gas supply passage 44a in the vertical direction. The number of the fuel gas discharge passages 48b may be one. The number of the oxygen-containing gas discharge passages 44b may be one. The number of the coolant supply passages 46a may be one. The number of the coolant discharge passages 46b may be one.

In the present embodiment, the oxygen-containing gas supply passage 44a has a hexagonal shape, for example, but is not limited thereto. The oxygen-containing gas supply passage 44a may have a shape other than a hexagonal shape (e.g., a rectangular shape). Similarly, the fuel gas supply passage 48a may have a shape other than the hexagonal shape.

Each oxygen-containing gas discharge passage 44b has a triangular shape, for example, but is not limited thereto. Each oxygen-containing gas discharge passage 44b may have, for example, a triangular shape with rounded corners or a triangular shape (substantially hexagonal shape) with straight chamfered corners. The same applies to the shapes of the fuel gas discharge passages 48b, the coolant supply passages 46a, and the coolant discharge passages 46b.

The first bipolar plate 30 and the second bipolar plate 32 are incorporated into the stack body 84 as a separator 28. Each first bipolar plate 30 has an MEA surface 50a and a coolant surface 52a which is the back surface of the MEA surface. Each second bipolar plate 32 has an MEA surface 50b and a coolant surface 52b which is the back surface of the MEA surface. Each of the MEA surfaces 50a and 50b faces the membrane electrode assembly 26.

Figure 4:
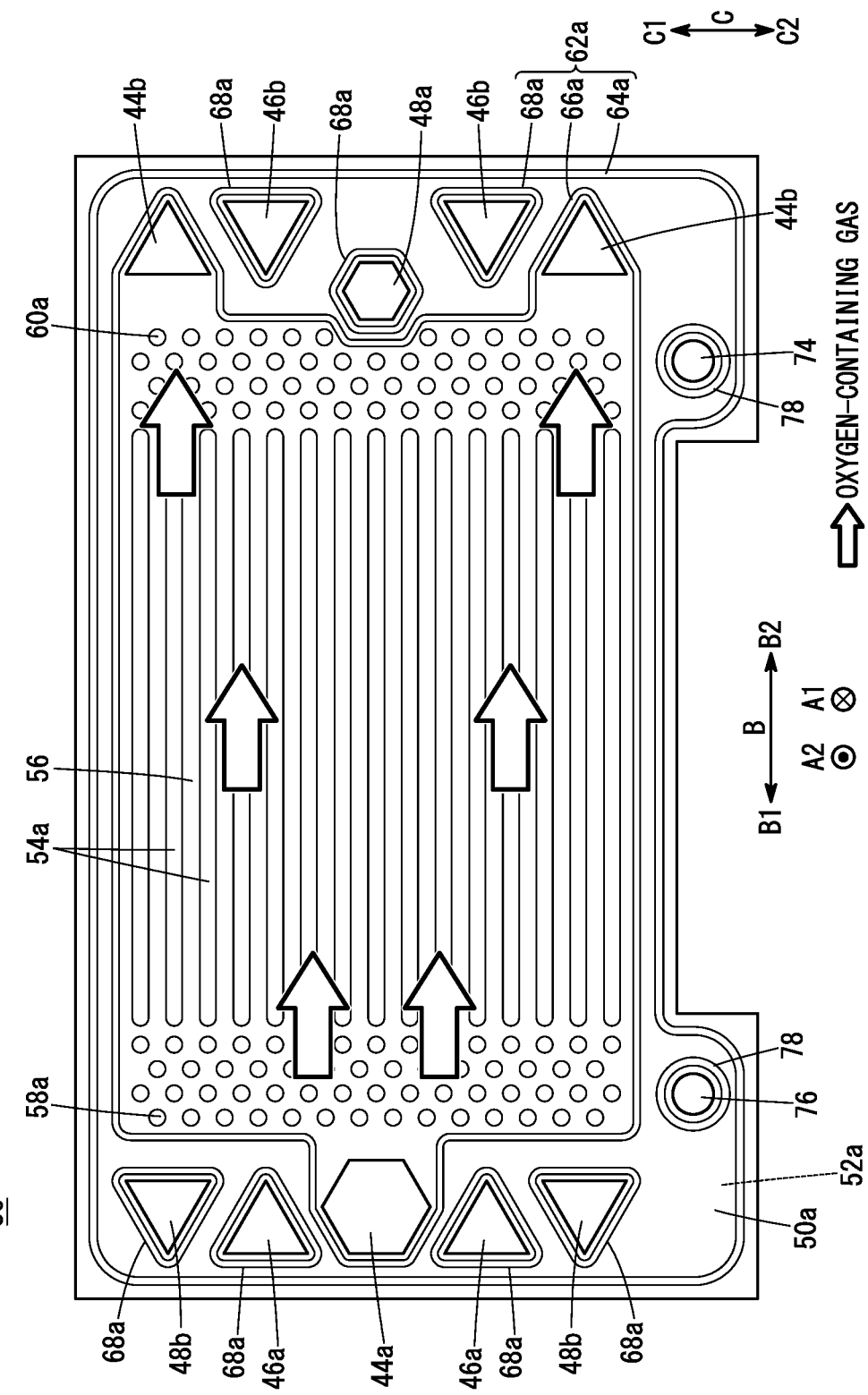
FIG. 4 is a front view of a surface of a first bipolar plate on which oxygen-containing gas flow field is provided.

As shown in FIG. 4, the MEA surface 50a of the first bipolar plate 30 is provided with a plurality of protrusions 54a extending linearly in the direction of arrow B. A plurality of linear grooves are formed between the protrusions 54a. The plurality of grooves constitute an oxygen-containing gas flow field 56. Each protrusion 54a and each groove may extend in a wavy shape. The oxygen-containing gas flow field 56 fluidly communicates with one oxygen-containing gas supply passage 44a and two oxygen-containing gas discharge passages 44b to allow the oxygen-containing gas to flow in the surface direction of the separator 28 (the direction indicated by the arrow B and the direction indicated by the arrow C).

An inlet buffer portion 58a is provided between the oxygen-containing gas supply passage 44a and the oxygen-containing gas flow field 56. A plurality of bosses are provided on the inlet buffer portion 58a by press forming. Each boss protrudes toward the resin frame equipped membrane electrode assembly 26. An outlet buffer portion 60a is provided between the oxygen-containing gas discharge passages 44b and the oxygen-containing gas flow field 56. A plurality of bosses are provided on the outlet buffer portion 60a by press forming. Each boss protrudes toward the resin frame equipped membrane electrode assembly 26.

On the MEA surface 50a of the first bipolar plate 30, a plurality of metal bead seals 62a are integrally provided. Each metal bead seal 62a protrudes toward the membrane electrode assembly 26 (FIG. 3). Each metal bead seal 62a is provided by, for example, press-forming. Instead of the metal bead seal 62a, a convex elastic seal made of an elastic material such as rubber may be provided on the MEA surface 50a.

The plurality of metal bead seals 62a includes an outer bead portion 64a, an inner bead portion 66a, and a plurality of passage bead portions 68a. The outer bead portion 64a is provided on the outer peripheral portion of the MEA surface 50a. The inner bead portion 66a surrounds the oxygen-containing gas flow field 56, the oxygen-containing gas supply passage 44a, and the two oxygen-containing gas discharge passages 44b. The oxygen-containing gas flow field 56, the oxygen-containing gas supply passage 44a, and the two oxygen-containing gas discharge passages 44b are surrounded by the inner bead portion 66a in a state of communicating with each other.

The plurality of passage bead portions 68a surround the fuel gas supply passage 48a, the fuel gas discharge passages 48b, the coolant supply passages 46a, and the coolant discharge passages 46b. It is noted that the outer bead portion 64a may be installed as needed, or it can be omitted.

As shown in FIG. 1, the MEA surface 50b of the second bipolar plate 32 is provided with a plurality of protrusions 54b extending linearly in the direction of arrow B. A plurality of linear grooves are formed between the protrusions 54b. The plurality of grooves constitute a fuel gas flow field 70. Each protrusion 54b and each groove may extend in a wavy shape. The fuel gas flow field 70 is fluidly connected to one fuel gas supply passage 48a and two fuel gas discharge passages 48b, thereby allowing the fuel gas to flow in the surface direction of the separator 28 (the arrow B direction and the arrow C direction).

An inlet buffer portion 58b is provided between the fuel gas supply passage 48a and the fuel gas flow field 70. A plurality of bosses are provided on the inlet buffer portion 58b by press forming. Each boss protrudes toward the resin frame equipped membrane electrode assembly 26. An outlet buffer portion 60b is provided between the fuel gas discharge passages 48b and the fuel gas flow field 70. A plurality of bosses are provided on the outlet buffer portion 60b by press forming. Each boss protrudes toward the resin frame equipped membrane electrode assembly 26.

On the MEA surface 50b of the second bipolar plate 32, a plurality of metal bead seals 62b are integrally provided. Each metal bead seal 62b protrudes toward the membrane electrode assembly 26 (FIG. 3). Each metal bead seal 62b is provided by, for example, press-forming. Instead of the metal bead seal 62b, a convex elastic seal made of an elastic material such as rubber may be provided. The plurality of metal bead seal 62b includes an outer bead portion 64b, an inner bead portion 66b, and a plurality of passage bead portions 68b. The outer bead portion 64b is provided on the outer peripheral portion of the MEA surface 50b. The inner bead portion 66b surrounds the fuel gas flow field 70, the fuel gas supply passage 48a, and the two fuel gas discharge passages 48b. The fuel gas flow field 70, the fuel gas supply passage 48a, and the two fuel gas discharge passages 48b are surrounded by the inner bead portion 66b in a mutually communicated state.

The plurality of passage bead portions 68b surround the oxygen-containing gas supply passage 44a, the oxygen-containing gas discharge passages 44b, the coolant supply passages 46a, and the coolant discharge passages 46b. It is noted that the outer bead portion 64b may be installed as needed, or it can be omitted.

As shown in FIG. 3, the coolant surface 52a of the first bipolar plate 30 and the coolant surface 52b of the second bipolar plate 32 are joined together. A coolant flow field 72 is provided between the coolant surface 52a and the coolant surface 52b. The coolant flow field 72 allows the coolant to flow in the surface direction (arrow B direction, arrow C direction) of the separator 28. The coolant flow field 72 fluidly communicates with the two coolant supply passages 46a and the two coolant discharge passages 46b.

The coolant flow field 72 is formed by overlapping the back surface of the oxygen-containing gas flow field 56 of the first bipolar plate 30 and the back surface of the fuel gas flow field 70 of the second bipolar plate 32. In the coolant surfaces 52a and 52b of the first bipolar plate 30 and the second bipolar plate 32 facing each other, the periphery of the passages of the first bipolar plate 30 and the periphery of the passages of the second bipolar plate 32 are joined to each other by welding, brazing, or the like.

As shown in FIG. 2, the fuel cell stack 16 is provided with a first drain 74. The first drain 74 penetrates the resin frame member 36 and the separator 28 in the stacking direction (the direction of arrow A). The first drain 74 is disposed below the bottom portion of the lower oxygen-containing gas discharge passage 44b. The first drain 74 communicates with the upper oxygen-containing gas discharge passage 44b via a first connection channel (not shown) provided at an end portion (for example, an insulator 20b) of the fuel cell stack 16 in the arrow A2 direction. Therefore, water generated at the cathode in the fuel cell stack 16 during power generation can be discharged to the outside of the fuel cell stack 16 via the first drain 74.

The fuel cell stack 16 is provided with a second drain 76. The second drain 76 penetrates the resin frame member 36 and the separator 28 in the stacking direction (the direction of the arrow A). The second drain 76 is disposed below the bottom portion of the lower fuel gas discharge passage 48b. The second drain 76 communicates with the upper fuel gas discharge passage 48b via a second connection channel (not shown) provided at an end portion (e.g., an insulator 20b) of the fuel cell stack 16 in the direction of the arrow A2. Therefore, the generated water can be discharged from the anode in the fuel cell stack 16 to the outside of the fuel cell stack 16 via the second drain 76.

As shown in FIGS. 1, 3, and 4, in each separator 28, a ring-shaped bead seal 78 for preventing leakage of produced water is provided around the first drain 74. In each separator 28, a ring-shaped bead seal 78 for preventing leakage of produced water is provided around the second drain 76. The ring-shaped bead seal 78 protrudes from each separator 28 toward the adjacent resin frame equipped membrane electrode assembly 26 (FIG. 3).

As shown in FIG. 1, the fuel cell unit 12 of the present embodiment has one separator 28 and one resin frame equipped membrane electrode assembly 26. Specifically, the fuel cell unit 12 is formed by joining the first bipolar plate 30 of the separator 28 and the resin frame member 36 of the resin frame equipped membrane electrode assembly 26 to each other via the welded portion 80. In the present embodiment, a total of six welded portions 80 are provided on the outer peripheral portion of each fuel cell unit 12. The number of welded portions 80 provided in each fuel cell unit 12 is not particularly limited, and may be one or a plurality other than six.

A plurality of welded portions 80 are provided at an end portion (first short side) in the arrow B1 direction of the fuel cell unit 12. The first welded portion 80 is provided between the upper fuel gas discharge passage 48b and the upper coolant supply passage 46a at a position close to the edge of the fuel cell unit 12 in the direction of the arrow B1. The second welded portion 80 is provided between the lower fuel gas discharge passage 48b and the lower coolant supply passage 46a at a position close to the edge of the fuel cell unit 12 in the direction of the arrow B1. The third welded portion 80 is provided between the lower fuel gas discharge passage 48b and the second drain 76. That is, a total of three welded portions 80 are provided on the first short side of the fuel cell unit 12.

A plurality of welded portions 80 are provided at an end portion (second short side) of the fuel cell unit in the arrow B2. The fourth welded portion 80 is provided between the upper oxygen-containing gas discharge passage 44b and the upper coolant discharge passage 46b at a position close to the edge of the fuel cell unit 12 in the direction of the arrow B2. The fifth welded portion 80a is provided between the lower oxygen-containing gas discharge passage 44b and the lower coolant discharge passage 46b at a position close to the edge of the fuel cell unit 12 in the direction of the arrow B2. The sixth welded portion 80 is provided between the lower oxygen-containing gas discharge passage 44b and the first drain 74. That is, a total of three welded portions 80 are provided on the second short side of the fuel cell unit 12.

These welded portions 80 are arranged so as to avoid the metal bead seals 62a and 62b. The positions where the welded portions 80 of the fuel cell units 12 are provided are not limited to the six positions described above. The positions where the welded portions 80 are provided can be variously set according to, for example, the shapes of the separator 28 and the resin frame equipped membrane electrode assembly 26.

In the present embodiment, each welded portion 80 has a substantially circular shape as viewed in the stacking direction (direction of arrow A) of the separator 28 and the resin frame equipped membrane electrode assembly 26 (as viewed in the irradiation direction of a laser beam LB described later). The second bipolar plate 32 has a through hole 82 formed at a portion overlapping with the welded portion 80 in the stacking direction. The dimension of each through hole 82 as viewed in the stacking direction is preferably equal to or greater than the dimension of the welded portion 80. The shape of each through hole 82 as viewed in the stacking direction is not particularly limited, but may be, for example, a circular shape.

Figure 6:
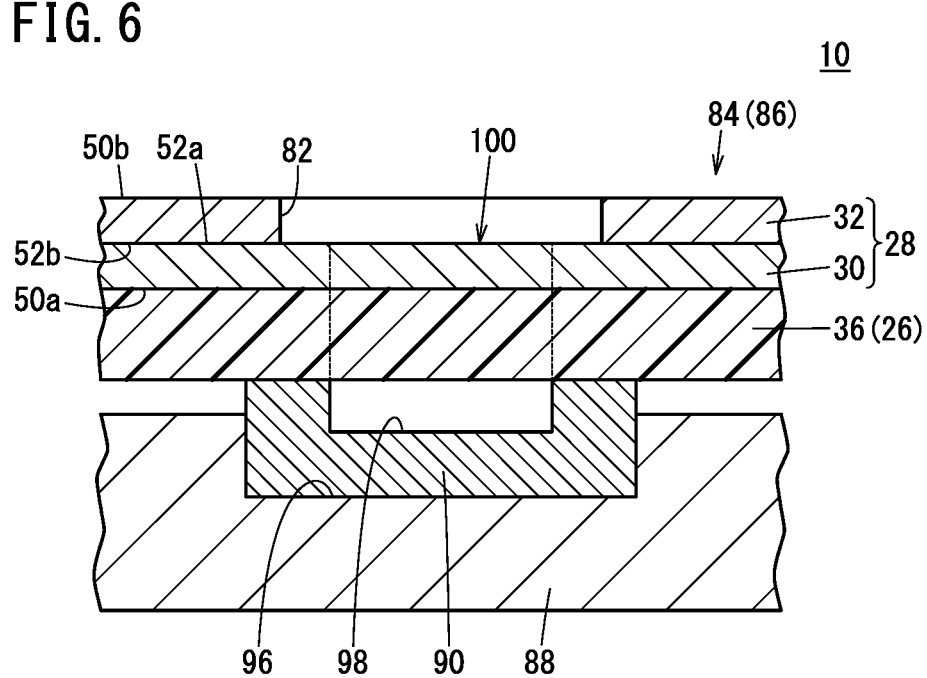
FIG. 6 is a cross-sectional view illustrating a state in which a stacked portion is disposed on a metal spacer in the manufacturing apparatus for a fuel cell unit according to the present embodiment.
Figure 7:
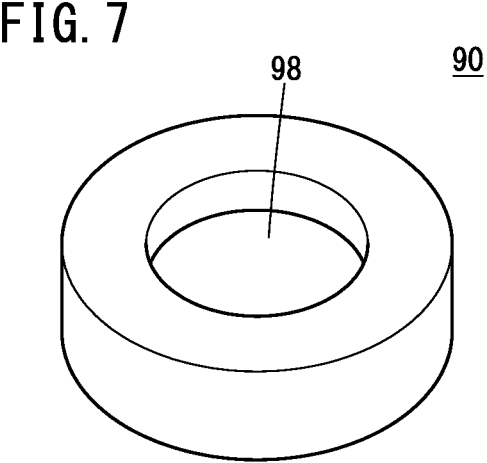
FIG. 7 is a perspective view illustrating the shape of the recess of the metal spacer as viewed in the irradiation direction.
Figure 8:
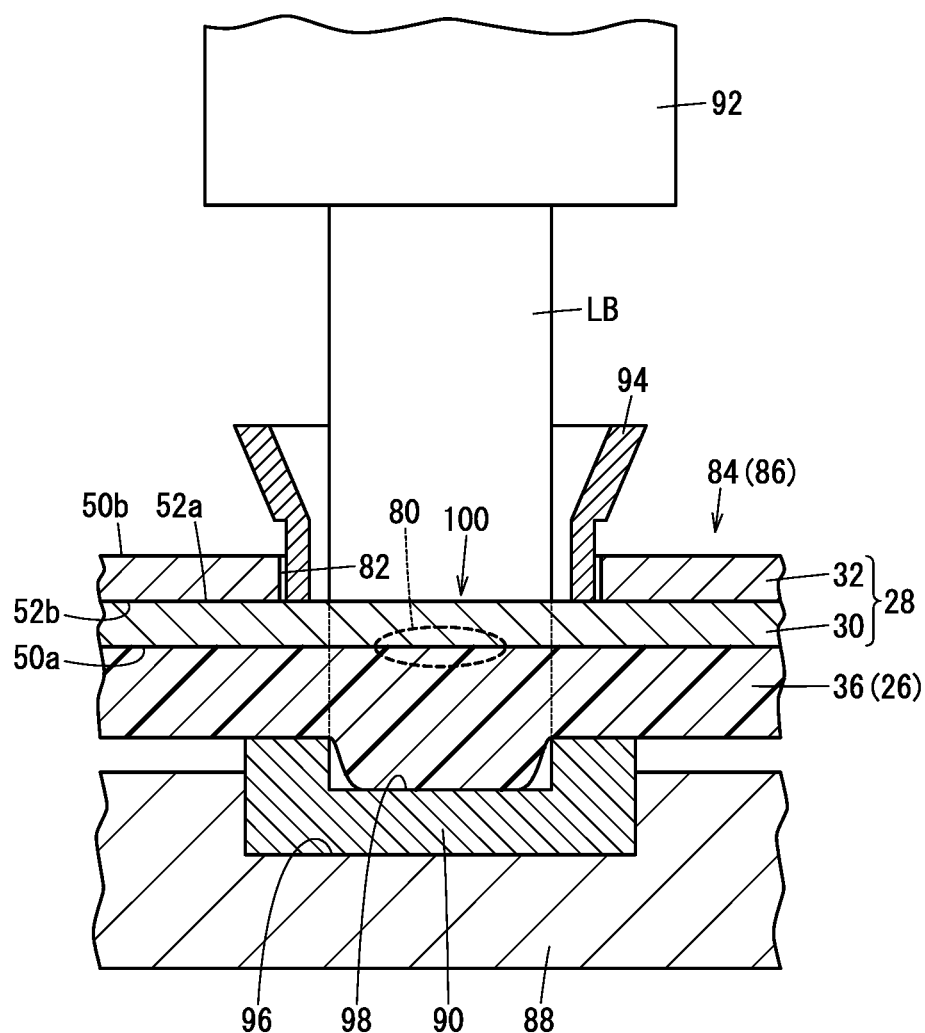
FIG. 8 is a cross-sectional view for explaining a step of irradiating a joining target portion of the stacked portion of FIG. 6 with a laser beam by a laser irradiation unit.

A manufacturing apparatus 10 for a fuel cell unit 12 (hereinafter, also simply referred to as a manufacturing apparatus 10) according to the present embodiment will be described mainly with reference to FIGS. 6 to 8. As shown in FIG. 8, the manufacturing apparatus 10 forms the welded portion 80 by irradiating a joining (welding) target portion 100 of the stacked portion 86 with the laser beam LB. The stack body 84 is a structure in which the first bipolar plate 30 of the separator 28 is stacked on the resin frame equipped membrane electrode assembly 26. The stacked portion 86 is a stacked portion including, stacked together, the resin frame member 36 and the outer peripheral portion of the separator 28 in the stack body 84. The joining target portion 100 is a portion where the welded portion 80 is provided in the stacked portion 86 after the laser beam LB irradiation.

That is, the stack body 84 is a structure in a state before the welded portion 80 is formed at the joining target portion 100 of the stacked portion 86. The manufacturing apparatus 10 forms the welded portion 80 at the joining target portion 100 of the stacked portion 86, whereby the components of the stacked portion 86 are welded to form the fuel cell unit 12.

Specifically, as shown in FIG. 8, the manufacturing apparatus 10 includes a base portion 88, a metal spacer 90, a laser irradiation unit 92, and a pressing portion 94. The resin frame equipped membrane electrode assembly 26 and the separator 28 are placed on the base portion 88 in this order. At this time, the first bipolar plate 30 of the separator 28 faces the resin frame equipped membrane electrode assembly 26.

The base portion 88 has, for example, a pair of first positioning pins and a pair of second positioning pins (neither of which is shown) protruding upward. The first positioning pins are inserted into a pair of first positioning holes (not shown) provided in the resin frame equipped membrane electrode assembly 26. Thus, the resin frame equipped membrane electrode assembly 26 is positioned and placed on the base portion 88. The second positioning pins are inserted into second positioning holes (not shown) provided in the separator 28. As a result, the separator 28 is positioned and placed on the base portion 88 and the resin frame equipped membrane electrode assembly 26. As a result, the stack body 84 is formed on the base portion 88.

The positioning of the resin frame equipped membrane electrode assembly 26 and the separator 28 with respect to the base portion 88 may be performed using the same positioning pins. At least one of the first drain 74 and the second drain 76 may be used as at least one of the first positioning hole and the second positioning hole.

The base portion 88 is provided with a concave holding portion 96 for holding the metal spacer 90. The metal spacer 90 held by the holding portion 96 faces the resin frame member 36. The metal spacer 90 faces a region including the joining target portion 100 and the outer peripheral portion thereof of the stack body 84 formed on the base portion 88 as described above. In the present embodiment, the metal spacer 90 faces a region including a portion of the stack body 84 in which the through hole 82 is provided and a peripheral portion thereof.

The metal spacer 90 is formed of a metal material. The material of the metal spacer 90 is preferably copper, aluminum, or an alloy thereof having excellent thermal conductivity from the viewpoint of increasing the thermal conductivity of the metal spacer 90. As shown in FIG. 7, the metal spacer 90 has, for example, a substantially cylindrical shape. The upper surface of the substantially cylindrical metal spacer 90 faces the stack body 84. The outer shape of the metal spacer 90 is not particularly limited, and may be, for example, a shape other than a cylinder, such as a rectangular parallelepiped.

In the present embodiment, when viewed in the stacking direction of the stack body 84, the outer diameter of the upper surface of the metal spacer 90 is larger than that of the through hole 82. A recess 98 is formed in the upper surface of the metal spacer 90. The dimension of the recess 98 is substantially the same as the dimension of the joining target portion 100 when viewed in the stacking direction of the stack body 84. The inner diameter of the recess 98 is smaller than the inner diameter of the through hole 82. The recess 98 has a substantially circular shape when viewed in the stacking direction. The bottom surface of the recess 98 is flat. As an example of the dimension of the recess 98, the diameter of the recess 98 is set to 5.5 to 6.5 mm, and the depth of the recess 98 is set to 0.07 to 0.2 mm.

In the present embodiment, the upper surface of the metal spacer 90 protrudes upward from the upper surface of the base portion 88. However, the upper surface of the metal spacer 90 may be flush with the upper surface of the base portion 88.

As shown in FIG. 8, the laser irradiation unit 92 irradiates the joining target portion 100 of the stacked portion 86 disposed on the metal spacer 90 with the laser beam LB from the separator 28. In the present embodiment, the laser irradiation unit 92 irradiates the joining target portion 100 from the first bipolar plate 30 with the laser beam LB that has passed through the through hole 82 of the second bipolar plate 32. At this time, the resin frame member 36 of the joining target portion 100 irradiated with the laser beam LB faces the recess 98 of the metal spacer 90.

Conditions such as the irradiation intensity of the laser beam LB irradiated by the laser irradiation unit 92 are set such that a part of the resin frame member 36 is melted to form a welded portion 80 (FIGS. 1 and 9) capable of welding the resin frame member 36 and the first bipolar plate 30. In addition, the laser irradiation unit 92 performs irradiation of the laser beam LB such that the welded portion 80 having a circular shape when viewed in the irradiation direction of the laser beam LB (when viewed in the stacking direction of the stack body 84) is formed in the joining target portion 100.

The pressing portion 94 presses the peripheral portion of the joining target portion 100 of the stacked portion 86 placed on the metal spacer 90, toward a portion of the metal spacer 90 that is located around the recess 98 from above. In the present embodiment, the distal end of the pressing portion 94 is inserted into the through hole 82 of the second bipolar plate 32 and abuts against the coolant surface 52a of the first bipolar plate 30. The pressing portion 94 may contact the MEA surface 50b of the second bipolar plate 32 outside the through hole 82.

The manufacturing apparatus 10 may include, for example, one metal spacer 90, one laser irradiation unit 92, and one pressing portion 94. In this case, the plurality of welded portions 80 can be formed one by one by sequentially irradiating the plurality of joining target portions 100 with the laser beam LB. The manufacturing apparatus 10 may include, for example, a plurality of metal spacers 90, a plurality of laser irradiation units 92, and a plurality of pressing portions 94. In this case, it is possible to simultaneously form the plurality of welded portions 80 by irradiating a predetermined number of joining target portions 100 or all of the plurality of joining target portions 100 with the laser beam LB.

The manufacturing apparatus 10 is basically configured as described above. Hereinafter, a manufacturing method for the fuel cell unit 12 according to the present embodiment will be described with reference to an example in which the fuel cell unit 12 of FIG. 1 is obtained using the manufacturing apparatus 10 of FIG. 8.

In the manufacturing method for the fuel cell unit 12, a stacking step is performed. In the stacking step, as shown in FIG. 6, the stack body 84 is formed on the base portion 88. Specifically, first, only the resin frame equipped membrane electrode assembly 26 is disposed on the base portion 88. At this time, the first positioning pins of the base portion 88 are inserted into the first positioning holes of the resin frame equipped membrane electrode assembly 26. In the present embodiment, the anode 40 of the resin frame equipped membrane electrode assembly 26 faces the base portion 88.

Figure 5:
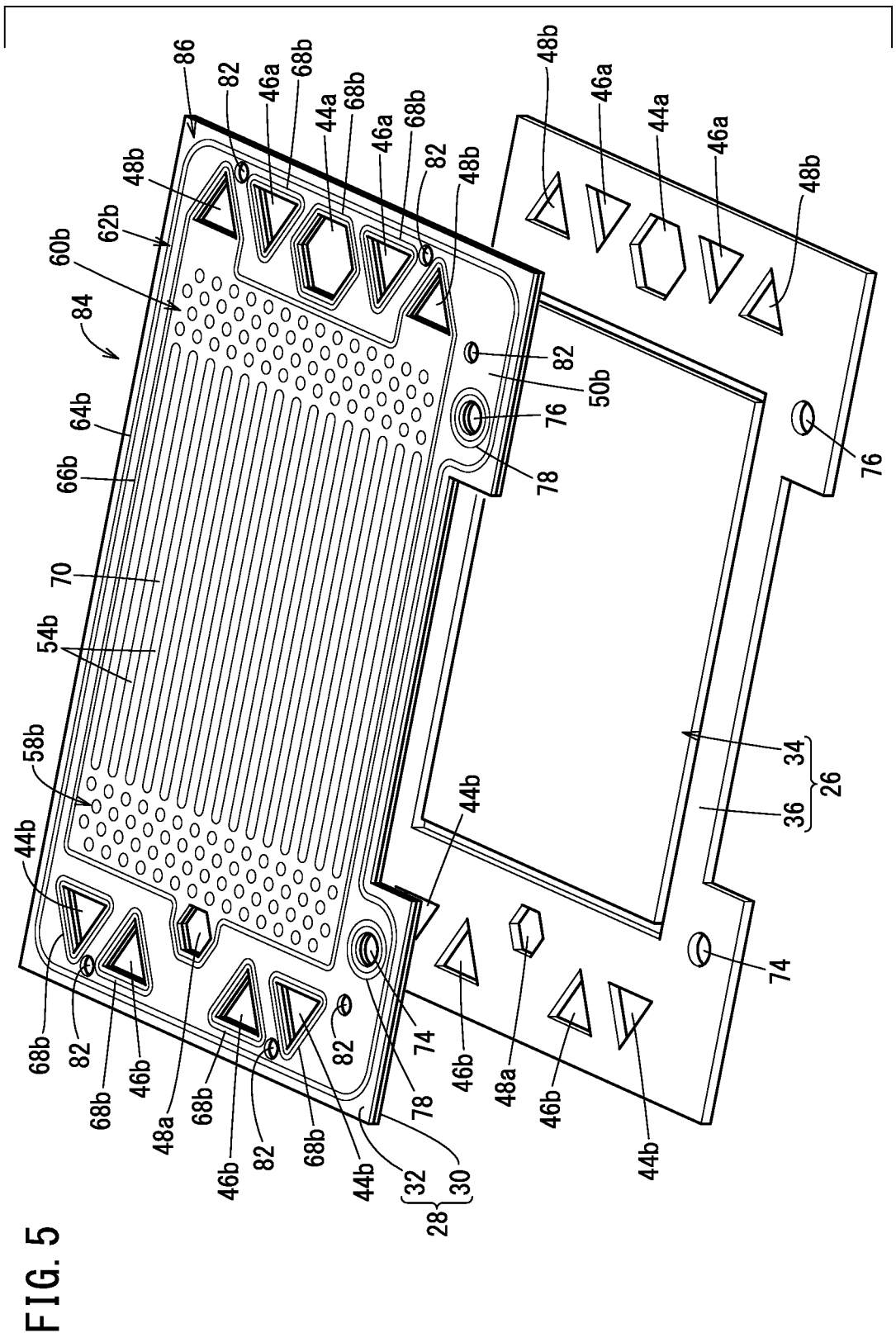
FIG. 5 is a perspective view illustrating a direction in which the separator and the resin frame equipped membrane electrode assembly are stacked during manufacturing.

Next, the separator 28 formed by integrally joining the first bipolar plate 30 and the second bipolar plate 32 is stacked on the resin frame equipped membrane electrode assembly 26 disposed on the base portion 88. At this time, the second positioning pin of the base portion 88 is inserted into the second positioning hole of the separator 28. In the present embodiment, as shown in FIG. 5, the first bipolar plate 30 of the separator 28 faces the cathode 42 of the resin frame equipped membrane electrode assembly 26.

In the stacked portion 86 of the stack body 84 formed on the base portion 88 as described above, the resin frame member 36 of the joining target portion 100 faces the recess 98 of the metal spacer 90. The through hole 82 of the stacked portion 86 and the resin frame member 36 around the through hole 82 face the upper surface of the metal spacer 90. In the stacking step, the resin frame equipped membrane electrode assembly 26 and the separator 28 may be stacked and thereafter disposed on the base portion 88.

After the stacking step, a laser irradiation step of irradiating the joining target portion 100 with the laser beam LB is performed by the laser irradiation unit 92. In the present embodiment, as shown in FIG. 8, the joining target portion 100 is irradiated with the laser beam LB in a state in which the peripheral portion of the joining target portion 100 of the stacked portion 86 is pressed toward a portion of the metal spacer 90 that lies around the recess 98 by the pressing portion 94. Specifically, the distal end of the pressing portion 94 is inserted into the through hole 82 of the second bipolar plate 32 and brought into contact with the periphery of the joining target portion 100 of the first bipolar plate 30. As a result, portions of the first bipolar plate 30 and the resin frame member 36 that are located around the joining target portion 100 are pressed from above toward an upper surface of the metal spacer 90 that lies around the recess 98 via the pressing portion 94.

In this state, the laser irradiation unit 92 irradiates the joining target portion 100 with the laser beam LB. The laser beam LB passes through the through hole 82 of the second bipolar plate 32 and is applied to the first bipolar plate 30 (the joining target portion 100 of the stacked portion 86). As a result, the joining target portion 100 of the stacked portion 86 is heated. The expanded portion of the resin frame member 36 generated by this heating enters the inside of the recess 98 of the metal spacer 90.

Figure 9:
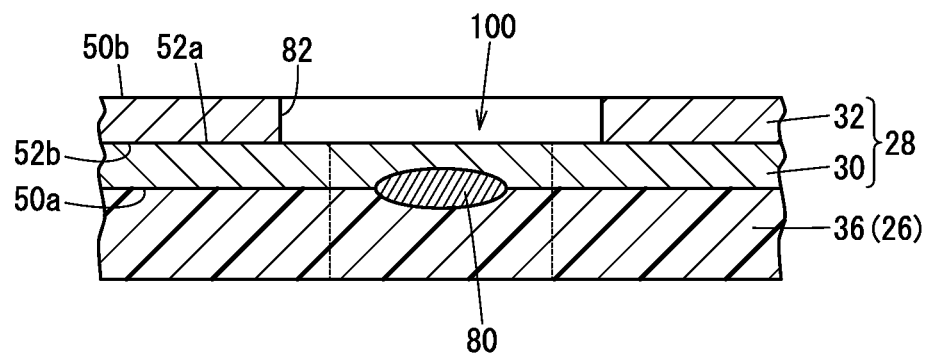
FIG. 9 is a cross-sectional view illustrating a welded portion formed at a joining target portion in FIG. 8.

A part of the resin frame member 36 melted by the irradiation of the laser beam LB is solidified, whereby, as shown in FIG. 9, a welded portion 80 where the first bipolar plate 30 and the resin frame member 36 have been welded to each other is formed at the joining target portion 100. As shown in FIG. 1, the welded portion 80 is formed in a circular shape inside the through hole 82 when viewed in the irradiation direction of the laser beam LB.

As described above, by sequentially or simultaneously forming the plurality of welded portions 80, the fuel cell unit 12 can be obtained by joining the separator 28 and the resin frame equipped membrane electrode assembly 26.

The operation of the fuel cell stack 16 obtained by stacking a plurality of fuel cell units 12 will be briefly described below. As shown in FIGS. 2 and 3, when power generation is performed by the fuel cell stack 16, the fuel gas is supplied to the fuel gas supply passage 48a, the oxygen-containing gas is supplied to the oxygen-containing gas supply passage 44a, and the coolant is supplied to the coolant supply passage 46a.

As shown in FIG. 3, the oxygen-containing gas is introduced into the oxygen-containing gas flow field 56 from the oxygen-containing gas supply passage 44a. The oxygen-containing gas flows along the oxygen-containing gas flow field 56 in the direction indicated by the arrow B, and is supplied to the cathode 42 of the resin frame equipped membrane electrode assembly 26. On the other hand, as shown in FIG. 5, the fuel gas is introduced into the fuel gas flow field 70 from the fuel gas supply passage 48a. The fuel gas is supplied to the anode 40 of the resin frame equipped membrane electrode assembly 26 while flowing in the direction of arrow B along the fuel gas flow field 70.

Therefore, as shown in FIG. 3, in each resin frame equipped membrane electrode assembly 26, the oxygen-containing gas supplied to the cathode 42 and the fuel gas supplied to the anode 40 are consumed by electrochemical reactions in the cathode catalyst layer and the anode catalyst layer. Thus, power is generated.

The oxygen-containing gas (oxygen-containing exhaust gas) that has not been consumed in the electrochemical reactions flows from the oxygen-containing gas flow field 56 into the oxygen-containing gas discharge passage 44b. The oxygen-containing gas flows through the oxygen-containing gas discharge passage 44b in the direction indicated by the arrow A and is discharged from the fuel cell stack 16. Similarly, the fuel gas (fuel exhaust gas) that has not been consumed in the electrochemical reactions flows into the fuel gas discharge passage 48b from the fuel gas flow field 70. The fuel gas flows through the fuel gas discharge passage 48b in the direction of arrow A and is discharged from the fuel cell stack 16.

The coolant is introduced into the coolant flow field 72 from the coolant supply passage 46*a*. The coolant exchanges heat with the resin frame equipped membrane electrode assembly 26 while flowing in the direction of arrow B along the coolant flow field 72. The heat-exchanged coolant flows into the coolant discharge passage 46*b*. The coolant flows through the coolant discharge passage 46*b* in the direction of arrow A and is discharged from the fuel cell stack 16.

As described above, in the method and apparatus 10 for manufacturing the fuel cell unit 12 according to the present embodiment, the stacked portion 86 including, stacked together, the resin frame member 36 of the resin frame equipped membrane electrode assembly 26 and the outer peripheral portion of the separator 28 is placed on the metal spacer 90. At this time, the resin frame member 36 of the joining target portion 100 of the stacked portion 86 is placed so as to face the recess 98 formed in the metal spacer 90. In this state, a portion of the resin frame member 36 is melted by irradiating the separator 28 with the laser beam LB at the joining target portion 100 of the stacked portion 86 to heat the joining target portion 100. As a result, the welded portion 80 in which the separator 28 and the resin frame member 36 have been welded to each other can be formed. By forming the welded portion 80 in a state in which the resin frame member 36 is positioned with respect to the separator 28 in this manner, even if the resin frame member 36 is subjected to warpage, the separator 28 and the resin frame equipped membrane electrode assembly 26 can be fixed in a state in which mutual displacement is suppressed.

When the joining target portion 100 of the stacked portion 86 is irradiated with the laser beam LB as described above, the resin frame member 36 of the joining target portion 100 faces the recess 98 of the metal spacer 90. That is, the resin frame member 36 of the joining target portion 100 faces the recess 98 formed in the metal spacer 90 so as to be recessed away from the resin frame member 36 disposed on the metal spacer 90. Therefore, even if the resin frame member 36 of the joining target portion 100 is heated and expanded by the irradiation of the laser beam LB, the expanded portion of the resin frame member 36 can enter the inside of the recess 98.

As a result, it is possible to suppress a partial increase in the contact pressure between the resin frame member 36 and the metal spacer 90 during irradiation with the laser beam LB and also suppress generation of a portion where excessive heat is accumulated between the resin frame member 36 and the metal spacer 90. That is, the heat of the resin frame member 36 can be favorably conducted to the metal spacer 90, and thus it is possible to achieve a temperature suitable for substantially uniformly welding the joining target portion 100 of the stacked portion 86. As a result, for example, the welded portion 80 having a desired shape in which generation of air bubbles or the like is suppressed and having excellent joint strength can be formed in the joining target portion 100. This also effectively prevents the resin frame equipped membrane electrode assembly 26 and the separator 28 from being displaced from each other. In addition, the resin frame equipped membrane electrode assembly 26 and the separator 28 can be maintained in a positioned state.

Therefore, according to the manufacturing method and the manufacturing apparatus 10 for the fuel cell unit 12 of the present embodiment, it is possible to accurately and easily position the resin frame equipped membrane electrode assembly 26 and the separator 28 and to suppress the occurrence of mutual displacement as much as possible.

In the manufacturing method for the fuel cell unit 12 according to the above-described embodiment, the separator 28 includes the first bipolar plate 30 and the second bipolar plate 32. The first bipolar plate 30 and the second bipolar plate 32 are joined to each other in a stacked state. The second bipolar plate 32 has the through hole 82 at the joining target portion 100. In the stacking step, the first bipolar plate 30 of the separator 28 is placed so as to face the resin frame equipped membrane electrode assembly 26, and in the laser irradiation step, the first bipolar plate 30 at the joining target portion 100 is irradiated with the laser beam LB that has passed through the through hole 82 of the second bipolar plate 32.

In addition, in the manufacturing apparatus 10 of the fuel cell unit 12 according to the embodiment described above, the separator 28 includes the first bipolar plate 30 and the second bipolar plate 32 that are stacked and joined to each other, and the laser irradiation unit 92 irradiates the joining target portion 100 from the first bipolar plate 30 with the laser beam LB that has passed through the through hole 82 provided in the second bipolar plate 32.

In these cases, even in the separator 28 formed by joining the first bipolar plate 30 and the second bipolar plate 32, the stacked portion 86 can be irradiated with the laser beam LB from the first bipolar plate 30 via the through hole 82. As a result, since the resin frame member 36 at the joining target portion 100 can be heated suitably, the welded portion 80 can be formed suitably between the first bipolar plate 30 and the resin frame member 36. Alternatively, the second bipolar plate 32 may not be provided with the through hole 82, and the laser beam LB may be applied to the joining target portion 100 through the second bipolar plate 32.

In the above embodiment, the oxygen-containing gas flow field 56 is formed in the MEA surface 50*a* of the first bipolar plate 30, and the fuel gas flow field 70 is formed in the MEA surface 50*b* of the second bipolar plate 32. Alternatively, the fuel gas flow field 70 may be formed in the MEA surface 50*a* of the first bipolar plate 30, and the oxygen-containing gas flow field 56 may be formed in the MEA surface 50*b* of the second bipolar plate 32. In this case, the first bipolar plate 30 of the separator 28 and the anode 40 of the resin frame equipped membrane electrode assembly 26 are stacked to form a stack body 84.

In the manufacturing method for the fuel cell unit 12 according to the embodiment described above, the welded portion 80 and the recess 98 have circular shapes when viewed in the irradiation direction of the laser beam LB in the laser irradiation step. In addition, in the manufacturing apparatus 10 for the fuel cell unit 12 according to the embodiment described above, the recess 98 has a circular shape when viewed in the irradiation direction of the laser beam LB by the laser irradiation unit 92, and the laser irradiation unit 92 forms the welded portion 80 having a circular shape when viewed in the irradiation direction.

In these cases, the welded portion 80 can be easily formed at the joining target portion 100 of the stacked portion 86. The joint strength between the resin frame equipped membrane electrode assembly 26 and the separator 28 by the welded portion 80 can be favorably maintained. The welded portion 80 and the recess 98 may have shapes other than the circular shape when viewed in the irradiation direction of the laser beam LB.

Figure 10:
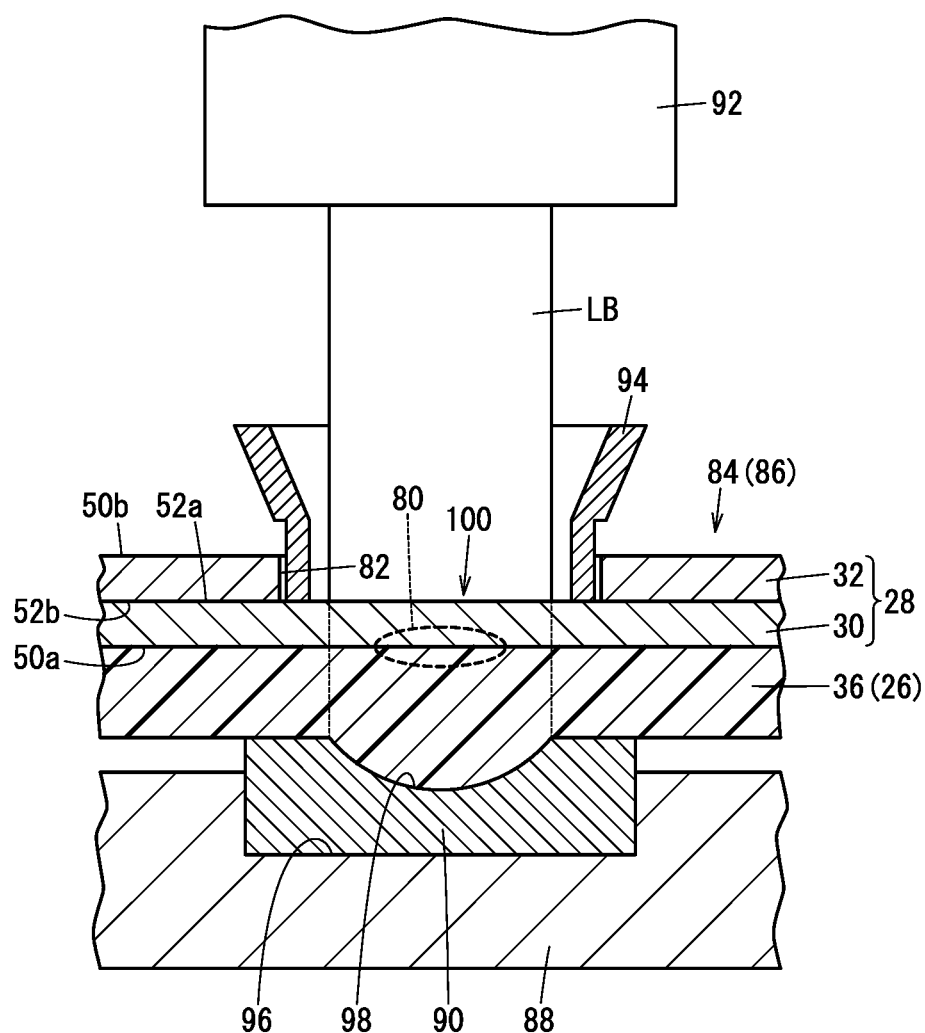
FIG. 10 is a cross-sectional view illustrating a recess of a metal spacer according to a modification.

In the embodiment described above, as shown in FIGS. 6 to 8, the bottom surface of the recess 98 is flat, but the invention is not particularly limited thereto. For example, as shown in FIG. 10, the bottom surface of the recess 98 may have a concave shape that curves downward and is depressed. Also in the case of using the metal spacer 90 having the recess 98 whose bottom surface has a concave shape, the welded portion 80 can be favorably formed in the same manner as in the above-described embodiment.

Further, in the above-described embodiment, the dimension of the upper surface of the metal spacer 90 is larger than that of the through hole 82 when viewed in the stacking direction of the stack body 84, but is not particularly limited thereto. In the embodiment described above, the dimension of the recess 98 is substantially the same as the dimension of the joining target portion 100 when viewed in the stacking direction of the stack body 84. However, the dimension of the recess 98 may be smaller than that of the joining target portion 100. The dimension of the recess 98 may be slightly larger than the joining target portion 100. In the above-described embodiment, the dimension of the recess 98 is smaller than the dimension of the through hole 82 when viewed in the stacking direction of the stack body 84. However, the dimension of the recess 98 is not particularly limited to this.

In the laser irradiation step of the manufacturing method for the fuel cell unit 12 according to the embodiment described above, the peripheral portion of the joining target portion 100 of the stacked portion 86 is pressed toward a portion of the metal spacer 90 that is located around the recess 98. The manufacturing apparatus 10 for the fuel cell unit 12 according to the above-described embodiment includes the pressing portion 94 that presses the peripheral portion of the joining target portion 100 of the stacked portion 86 toward a portion of the metal spacer 90 that is located around the recess 98.

In these cases, with a simple configuration such as the pressing portion 94 that presses the stacked portion 86 toward the metal spacer 90, it is possible to form the welded portion 80 having more excellent joint strength between the separator 28 and the resin frame equipped membrane electrode assembly 26. The manufacturing apparatus 10 does not necessarily include the pressing portion 94. That is, in the laser irradiation step, the joining target portion 100 may be irradiated with the laser beam LB without pressing the peripheral portion of the joining target portion 100 of the stacked portion 86 toward a portion of the metal spacer 90 that is located around the recess 98.

The present invention is not limited to the embodiments described above, and various modifications are possible without departing from the essence and gist of the invention.

In the above-described embodiment, a so-called individual-cell cooling structure in which the coolant flow field 72 is interposed between the adjacent resin frame equipped membrane electrode assemblies 26 is employed. However, instead of this, a so-called skip cooling structure may be adopted. Even in the case where the fuel cell stack 16 has the skip cooling structure, the fuel cell unit (not shown) can be obtained by similarly joining the separator 28 and the resin frame equipped membrane electrode assembly 26, which are disposed adjacent to each other, by the welded portion 80.

What is claimed is:

1. A manufacturing method for a fuel cell unit obtained by joining a resin frame equipped membrane electrode assembly to a separator,
    the resin frame equipped membrane electrode assembly including a membrane electrode assembly and a resin frame member attached to an outer peripheral portion of the membrane electrode assembly,
    the membrane electrode assembly including an electrolyte membrane and electrodes disposed on both sides of the electrolyte membrane,
    the manufacturing method comprising a stacking step and a laser irradiation step, wherein:
    in the stacking step, a stacked portion including, stacked together, the resin frame member of the resin frame equipped membrane electrode assembly and an outer peripheral portion of the separator is placed on an upper surface of a metal spacer, and the resin frame member at a joining target portion of the stacked portion is placed so as to face a recess formed in the upper surface of the metal spacer; and
    in the laser irradiation step, a welded portion where the resin frame member and the separator are welded to each other is formed by irradiating the separator at the joining target portion with a laser beam directed from the separator toward the recess.

2. The manufacturing method for the fuel cell unit according to claim 1, wherein:
    the separator includes a first bipolar plate and a second bipolar plate;
    the first bipolar plate and the second bipolar plate are joined to each other in a stacked state;
    the second bipolar plate has a through hole at the joining target portion;
    in the stacking step, the first bipolar plate of the separator is placed so as to face the resin frame equipped membrane electrode assembly; and
    in the laser irradiation step, the first bipolar plate at the joining target portion is irradiated with the laser beam that has passed through the through hole of the second bipolar plate.

3. The manufacturing method for the fuel cell unit according to claim 1, wherein the welded portion and the recess have circular shapes when viewed in an irradiation direction of the laser beam in the laser irradiation step.

4. The manufacturing method for the fuel cell unit according to claim 1, wherein, in the laser irradiation step, a peripheral portion of the joining target portion of the stacked portion is pressed toward a portion of the metal spacer that is located around the recess.

5. A manufacturing apparatus for a fuel cell unit obtained by joining a resin frame equipped membrane electrode assembly to a separator,
    the resin frame equipped membrane electrode assembly including a membrane electrode assembly and a resin frame member attached to an outer peripheral portion of the membrane electrode assembly,
    the membrane electrode assembly including an electrolyte membrane and electrodes disposed on both sides of the electrolyte membrane,
    the manufacturing apparatus comprising a metal spacer and a laser irradiation unit,
    wherein:
    an upper surface of the metal spacer is provided with a recess;
    the recess faces the resin frame member at a joining target portion of a stacked portion;
    the stacked portion is formed by stacking the resin frame member of the resin frame equipped membrane electrode assembly and an outer peripheral portion of the separator on the upper surface of the metal spacer; and
    the laser irradiation unit forms a welded portion where the resin frame member and the separator are welded together, by irradiating the separator at the joining target portion with a laser beam directed from the separator toward the recess.

6. The manufacturing apparatus for the fuel cell unit according to claim 5, wherein:

the separator includes a first bipolar plate and a second bipolar plate;

the first bipolar plate and the second bipolar plate are joined to each other in a stacked state;

the second bipolar plate has a through hole at the joining target portion; and the laser irradiation unit irradiates the first bipolar plate at the joining target portion with the laser beam that has passed through the through hole of the second bipolar plate.

7. The manufacturing apparatus for the fuel cell unit according to claim 5, wherein:

the recess has a circular shape when viewed in a laser irradiation direction by the laser irradiation unit; and the laser irradiation unit forms the welded portion having a circular shape when viewed in the laser irradiation direction.

8. The manufacturing apparatus for the fuel cell unit according to claim 5, further comprising a pressing portion configured to press a peripheral portion of the joining target portion of the stacked portion toward a portion of the metal spacer that is located around the recess.

\* \* \* \* \*